July 1, 1930. N. N. BURKHOLDER 1,769,331
BALING PRESS
Filed Sept. 20, 1928 4 Sheets-Sheet 1
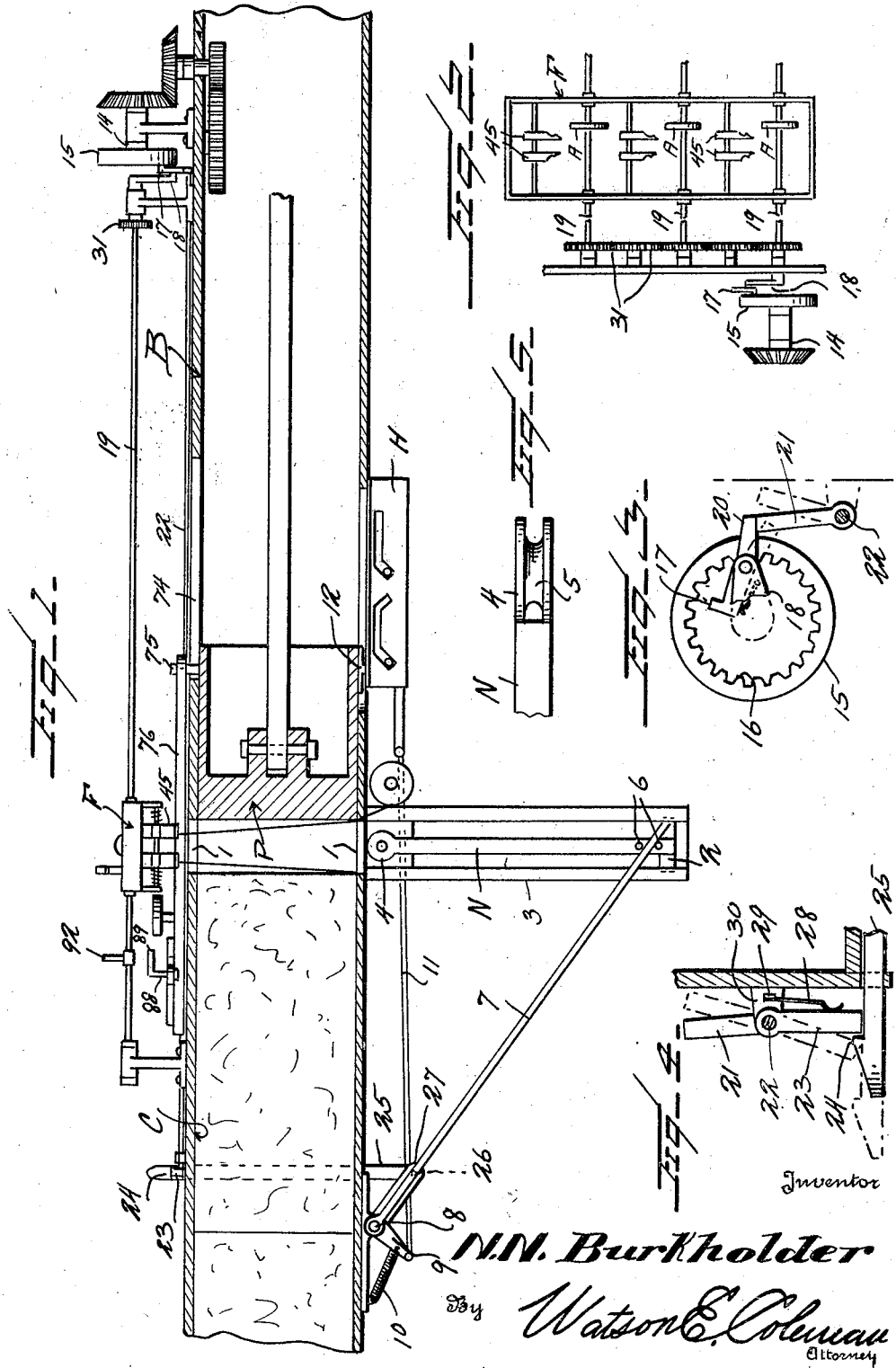

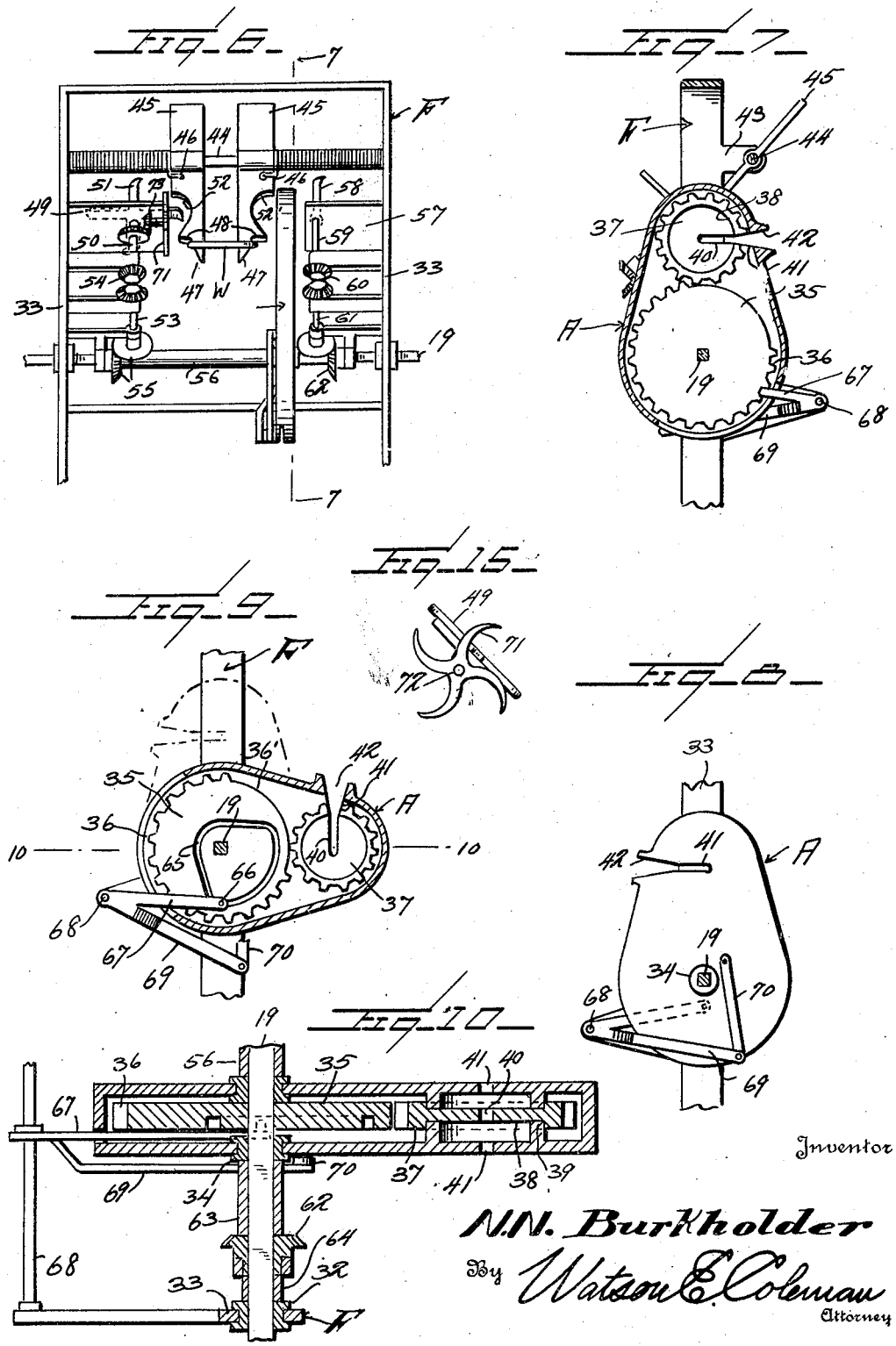

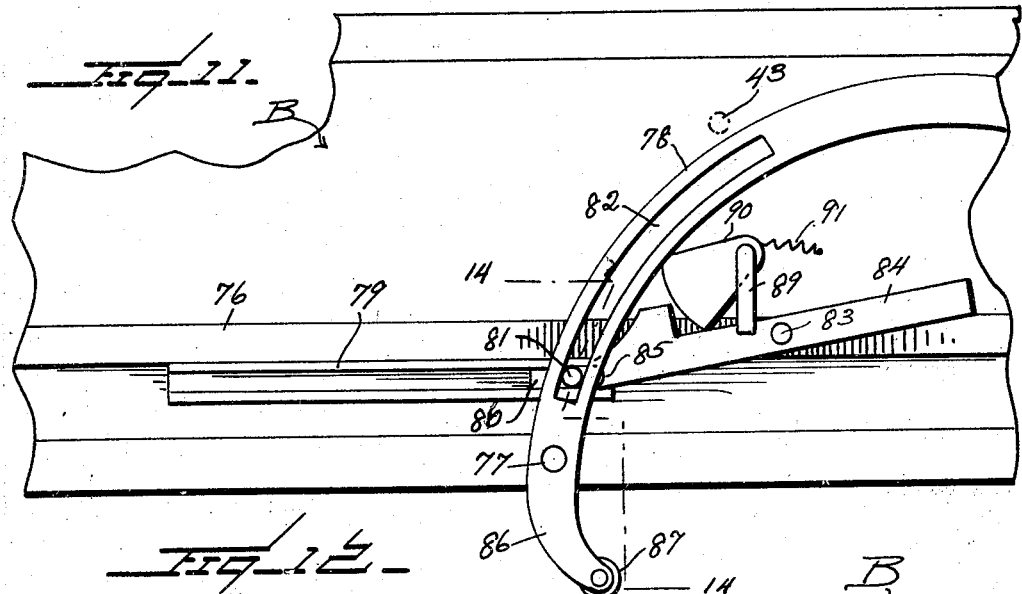
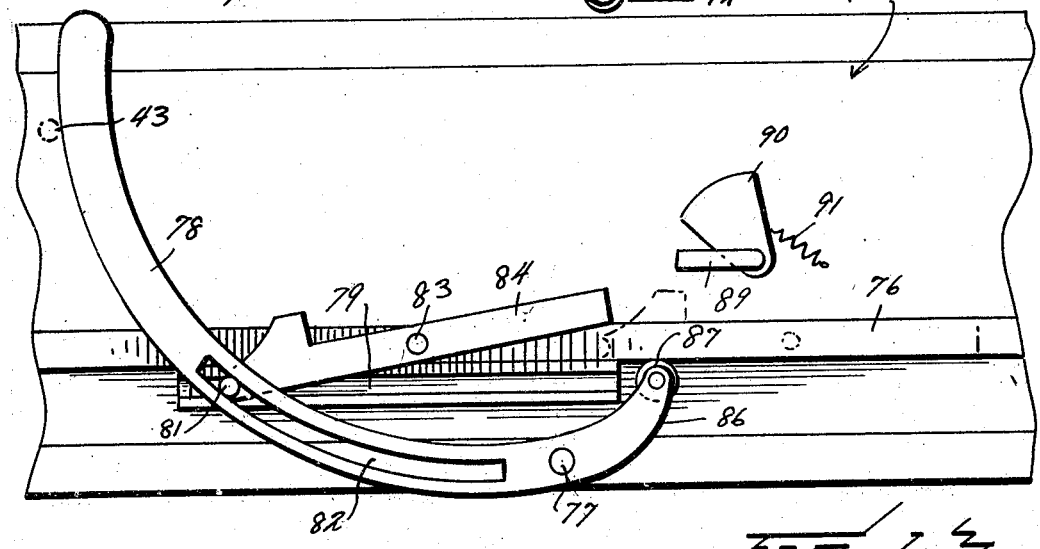
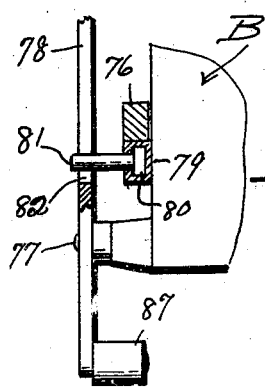

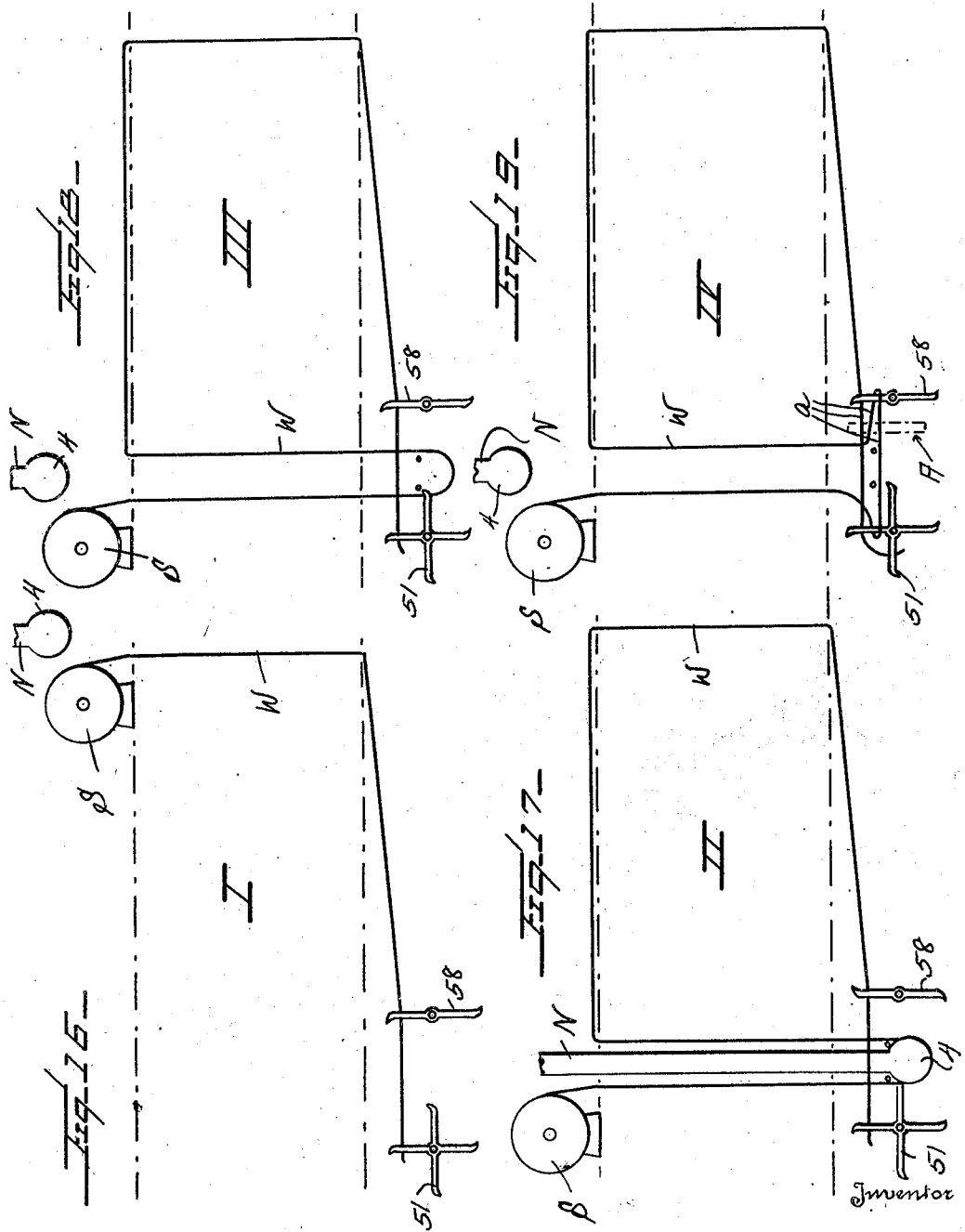

Patented July 1, 1930

1,769,331

UNITED STATES PATENT OFFICE

NOAH N. BURKHOLDER, OF EPHRATA, PENNSYLVANIA

BALING PRESS

Application filed September 20, 1928. Serial No. 307,276.

This invention relates to baling presses and an object of the invention is to provide a device of this kind with means whereby the baling wire may be properly applied, said means including a mechanism for both tying and cutting the wire after being properly applied.

The invention also has for an object to provide a tying mechanism supported for sliding movement along the press and which mechanism is caused to travel in accordance with the formation of the bale and whereby the mechanism at the completion of the bale within the baling chamber is in proper position to effect the requisite tying operation.

It is also an object of the invention to provide a tying mechanism for a baling press supported for sliding movement along the press together with means operating in an automatic manner to move the mechanism in a direction away from the baling chamber after the mechanism has completed a tying, said mechanism when so moved operating to properly position a wire or wires across the entrance end of the baling press to assure the proper disposition of such wire or wires with respect to three sides of the bale as said bale is formed within the baling chamber, the strain imposed upon the wire or wires during the formation of the bale serving to move the tying mechanism in a direction toward the baling chambers and into proper position to effect a tying operation upon completion of a bale within the baling chamber.

An additional object of the invention is to provide a tying mechanism for a baling press including a needle mounted for rectilinear movement across the inner or entrance end of the baling chamber.

The invention consists in the details of construction and in the combination and arrangement of the several parts of my improved baling press whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in top plan and partly in longitudinal section taken through a baling press having applied thereto a tying mechanism constructed in accordance with an embodiment of my invention;

Figure 2 is an elevational view of somewhat a diagrammatic character illustrating the movable or sliding parts of the mechanism;

Figure 3 is a fragmentary view partly in elevation and partly in section illustrating the controlling means for the operating shaft of the tying mechanism;

Figure 4 is a view partly in section and partly in elevation illustrating the latching means under control of the needle;

Figure 5 is a fragmentary view in side elevation of the outer end portion of the needle;

Figure 6 is an enlarged fragmentary view in elevation of a portion of the tying mechanism as herein employed;

Figure 7 is a sectional view taken substantially on the line 7—7 of Figure 6;

Figure 8 is a fragmentary view in elevation of the gear casing as illustrated in Figure 7 and the swinging means associated therewith;

Figure 9 is a view partly in section and partly in elevation of the mechanism as illustrated in Figure 7 looking at the opposite side thereof, the working position of the casing being indicated by broken lines and the second or inoperative position being in full lines;

Figure 10 is an enlarged detailed sectional view taken substantially on the line 10—10 of Figure 9;

Figure 11 is a fragmentary elevational view of a portion of the means as herein employed for automatically moving the tying mechanism in a direction away from the baling chamber;

Figure 12 is a view similar to Figure 11 showing certain of the parts in second position;

Figure 13 is a fragmentary view partly in top plan and partly in section of a portion of the mechanism as illustrated in Figure 11 and just before the trip dog has been thrown down in position to engage the driving lever;

Figure 14 is a sectional view taken substantially on the line 14—14 of Figure 11;

Figure 15 is a detailed elevational view of a wire cutter as herein employed;

Figure 16 is a diagrammatic view illustrating the first step in connection with the tying operation;

Figure 17 is a diagrammatic view illustrating a second step in the tying operation;

Figure 18 is a diagrammatic view illustrating a third step in the tying operation;

Figure 19 is a diagrammatic view illustrating a fourth step in the tying operation.

As disclosed in the accompanying drawings, B denotes a baling press of any desired type embodying a plunger or piston P arranged to reciprocate within the compression or baling chamber C, the material to be baled being delivered into the compression or baling chamber in any preferred manner.

The side walls of the press B at a point in advance of but closely adjacent to the piston or plunger P when at the limit of its inward or compression stroke, are provided with the openings 1 through which the needle N is adapted to pass. The needle N, as herein disclosed, is substantially straight from end to end and of a length to extend entirely across the press and a material distance therebeyond. The needle N is carried by a cross head 2 slidably engaged between the outstanding parallel trackways 3 suitably supported with respect to a side of the press B, and the working or free end portion of the needle N is transversely enlarged, as at 4, to provide a head, said head being substantially circular in plan and having its peripheral edge provided with a groove or channel 5.

The opposite end portion of the needle N, or that portion secured to the cross head 2, is provided with a pair of upstanding and longitudinally spaced fingers 6 between which is freely directed the outer end portion of an elongated arm 7. This arm 7 has its opposite end portion fixed to a vertically disposed shaft 8 rotatably supported by a side wall of the press B adjacent to the end thereof remote from the piston P. This shaft 8 is also provided with an outstanding rock arm 9 with which the retractile member or spring 10 is engaged to provide means to impart retracting movement to the arm 7 and the needle N.

Pivotally connected with the free end portion of the arm 9 is an end portion of a rod 11. Intermittent pull is imposed upon the rod 11 through the medium of a mechanism comprised within the housing H suitably positioned upon a side wall of the press B, said mechanism being preferably of the type disclosed in my Patent No. 1,671,966 dated June 5, 1928. As disclosed in this prior patent this mechanism is under control of a lug or projection 12 carried by the piston P, the coaction of the lug or projection 12 with the mechanism within the housing H being such to assure requisite travel of the needle N through the press or over the entrance end portion of the compression chamber C upon completion of a bale. As this particular mechanism forms no part of the present invention and is fully disclosed in my patent hereinbefore mentioned, it is not believed necessary that a detailed disclosure thereof need be given at this time.

The wall of the press B at the side thereof remote from the rod 11 and at a material point inwardly of the compression chamber C rotatably supports a shaft 14 adapted to be constantly driven when the press is in operation. The driving of the shaft 14 may be directed from the mechanism employed for reciprocating the piston P or otherwise as preferred. The shaft 14 carries a disc 15 provided around its outer face with a continuous internal gear 16 with which is adapted to be engaged a clutch dog 17 pivotally engaged with the free end portion of a rock arm 18 carried by the adjacent end portion of a driven shaft 19. This clutch dog 17 is provided with an extended tail piece 20 which is adapted to come in contact with the release arm 21 carried by a rock shaft 22. This rock shaft 22 extends along and is suitably supported by the adjacent wall of the press B and is of a length to terminate at a point relatively close to the shaft 8 hereinbefore referred to but at opposite sides of the press B. This forward end portion of the rock shaft 22 is provided with a depending rock arm 23 which terminates inwardly of an upstanding shoulder or abutment 24 provided upon an end portion of a lever 25. This lever 25 is supported by the press B for substantial reciprocation and has an end portion pivotally connected, as at 26, to a second rock arm 27 carried by the shaft 8.

As the needle N is projected across the compression chamber C, the lever 25 is moved a distance sufficient to permit the requisite rotation or rocking movement of the shaft 22 to throw the release arm 21 in a position free of the tail 20 of the clutch dog 17 whereupon the clutch dog 17 will engage the internal gear 16 to clutch the shafts 14 and 19 for unitary rotation.

This rocking action of the shaft 22 is accomplished automatically, as particularly illustrated in Figure 4 of the accompanying drawings, by a spring 28, one end portion being suitably anchored, as at 29, to a bearing 30 for the shaft 22 while the opposite or free end portion of the spring 28 has direct contact with the depending rock arm 23. As the needle N retracts the shoulder or abutment 24 will have requisite contact with the rock arm 23 to return the arm 21 into the path of travel of the tail piece 20 so that upon completion of a single rotation of the shaft 19 the same will be automatically declutched.

As herein disclosed, the shaft 19 referred to is one of three of such shafts, said shafts being in driven connection through the instrumentality of the gears 31 whereby all of said shafts will rotate in unison and in the same general direction. It is also to be noted that the gears 31 are of such ratio to cause said shafts to rotate at the same speed.

Supported by the shafts 19 for sliding movement therealong is a frame F of requisite dimensions, and held to the shafts 19 for sliding movement therealong but for rotation therewith are the bushings 32 each of which being rotatably engaged with a side member 33 of the frame F. The shafts 19 in the present embodiment of the invention are three in number as occasioned by the general practice of tying a bale with three wires as is required in shipment by railroad and it is, therefore, to be understood that these shafts 19 in practice are to be of a number equal to the number of tying wires required.

As the tying mechanisms directly associated with the shafts 19 are in each instance the same a detailed description will now be given with respect to a single one of such mechanisms. It is also to be understood in practice that a needle N is to be employed for each tie wire used.

Mounted upon a shaft 19 within the frame F is a casing A, the side walls of which each having rotatably engaged therewith a bushing 34 slidably engaged with the shaft 19 but rotating therewith. Arranged within the casing A and mounted upon the shaft 19 for rotation therewith but having sliding movement therealong is a disc 35 having disposed substantially three-quarters around its periphery the gear teeth 36 adapted to mesh with the gear wheel 37 rotatably supported within the casing A. This gear wheel 37 has the central portion of its opposed faces formed to provide circular recesses 38 and in each of which is snugly engaged a substantially annular flange 39 carried by a side wall of the casing A. By this means the gear wheel 37 is effectively maintained in desired operative position. The detailed construction of the casing A forms no part of my present invention and for which reason it is illustrated in the accompanying drawings in a conventional manner. It is to be understood, however, that the casing A will be constructed in any desired manner to facilitate the assembly of the disc 35 and gear wheel 37 therein.

During a single rotation of the shaft 19 the gear 37 will be caused to rotate three times, or more if desired.

This gear 37 constitutes a twisting member for the wire and is provided with a radial slot 40 extending from the axial center of said gear and when the teeth 36 are free from the gear 37 said slot 40 will register with the slots 41 in the side walls of the casing A and which slots 41 are in communication with a transversely disposed slot 42 provided in the adjacent side wall of the casing A.

Each of the side members 33 of the frame F at a desired point above the shaft 19 is provided with a rearwardly directed arm 43 which provides a mounting for an end portion of a rod 44 extending across the frame F. Freely mounted upon the central portion of the rod 44 for sliding movement lengthwise thereof and also for vertical swinging movement are the substantially flat fingers 45. These fingers 45 are normally disposed downwardly and outwardly on an angle of substantially 90°. Each of the fingers is normally maintained in this position through the instrumentality of the coil spring 46 encircling the rod 44 between the finger and the adjacent side member 33 of the frame F, one end of the spring being anchored to the finger 45 and the opposite end portion being suitably positioned to the adjacent side member 33 of the frame. This spring 46, as clearly illustrated in Figure 6 of the accompanying drawings, encircles the rod 44.

The fingers 45 are positioned to one side of the casing A and the lower or free end portions of said fingers 45 are provided with the points 47 resulting in the shoulders 48 arranged outwardly of said points.

The lower portions of the fingers 45 are in the path of travel of the needle N, or more particularly the head 4 thereof, and as the needle is projected across the baling or compression chamber with the wire the lower portions of the fingers 45 will ride upwardly over the laterally extended portions of said head to permit the points 47 to drop behind the wire W so that the same will be looped around the points as particularly illustrated in Figure 6. As the needle N is retracted the head 4 will readily pass therebetween as the fingers 45 will have requisite outward or separating movement. These two separate operations are materially facilitated by the substantial circular formation of the head 4.

To one side of the fingers 45 the frame F supports a plate 49 disposed on a downward incline toward the lower ends of the fingers 45 and substantially at right angles to the normal position of such fingers. This plate 49 has disposed therethrough a shaft 50 which carries a plurality of fingers 51 overlying the upper face of the plate 49. These fingers, as herein disclosed, are four in number and are equi-distantly spaced. These fingers 51 serve to effectively hold an end portion of the wire W to the plate 49 as particularly illustrated in Figures 16 to 19 inclusive. As these fingers 51 continue to rotate a succeeding finger engages within an adjacent end portion of the wire looped about the fingers 45 and draws a portion of the wire over upon the plate as illustrated in Figure 19, and to facilitate this operation the adjacent side marginal portion of the finger 45 next to the plate 49 is cut away, as at 52.

The shaft 50 hereinbefore referred to is driven by the shaft 53 through the medium of the intermeshing gears 54 and said shaft 53 in turn is driven from the shaft 19 through the medium of the intermeshing gears 55. One of the gears 55 is carried by a sleeve 56 slidably mounted upon the shaft 19 but rotating therewith. This sleeve 56 also serves as a spacing element to maintain certain of the various parts in desired spaced relation, particularly the casing A.

The second side member 33 of the frame F is provided with an inwardly disposed plate 57 arranged between said side member 33 and the casing A. This plate 57 is also disposed on an angle of approximately 90° similar to the plate 49, and traveling over a face thereof is a pair of oppositely directed fingers 58 carried by a shaft 59 driven through the medium of the gears 60 carried by the shaft 61 which in turn is driven through the medium of the gears 62 from the shaft 19. Interposed between one of the gears 62 and the casing A, and more particularly an adjacent bushing 34, is a spacing sleeve 63. The gear 62 is mounted upon the shaft 19 for movement lengthwise thereof but for rotation therewith. I also find it of advantage to interpose between the gear 62 and the adjacent bushing 32 a spacing sleeve 64.

As the shaft 59 rotates a finger 58 engages a portion of the wire looped around the fingers 45 and draws the same across or over the plate 57 as also indicated in Figure 19, resulting in the tie wire W having three portions $a$ arranged in overlapping relation.

During this operation just referred to relative to the arrangement of the wire with respect to the plates 49 and 57, the casing A is in its lowered or inoperative position as indicated by full lines in Figure 9, and during which period the intermediate arcuate portion 36' of the disc 35 will maintain said disc 35 free of the gear 37.

A face of the gear 35 is provided with a suitably formed cam groove 65 in which is engaged a part 66 carried by an arm 67. This arm 67 is supported for swinging movement by a second cross rod 68 connecting the side members of the frame F at a point below the shaft 19. This arm 67 is integrally formed with a second arm 69. The arms 67 and 69 converge toward the cross rod 68 and the outer or free end of the arm 69 has pivotally connected thereto a link 70 which in turn is pivotally connected to a side wall of the casing A as particularly illustrated in Figure 8 of the accompanying drawings. The cam groove is so formed that after the portions $a$ of the wire have been arranged as indicated in Figure 19, the casing A will be thrown upwardly into its working position as indicated by dotted lines in Figure 9 and by full lines in Figures 6, 7 and 8. When in this position the slots 40 and 41 will receive the portions $a$ of the wire W and as the gear 37 is rotated said portions will be wrapped one around the others and thereby effectively tying the wire. At the completion of this twisting operation, a cutter 71 will properly sever the wire with the free end portion of the wire leading from the spool S held by the arms 51 and 58 as particularly illustrated in Figures 16, 17 and 18.

To facilitate the proper travel of the arms 58 a portion of the adjacent finger 45 is also cut away, as at 52'.

The cutter 71 is carried by a portion of a shaft 72 rotatably carried by the plate 49 along the under surface thereof and said shaft 72 is in driven connection with the gears 73. These gears 73 are of proper ratio to assure the proper cutting of the wire.

The foregoing tying operation occurs during a single rotation of the shaft 19 and which rotation is under control of the member 25 hereinbefore referred to and it is, therefore, believed to be obvious that during the period the bale is being formed within the baling or compression chamber the shaft 19 is idle. After the completion of a tying operation the wire W is disposed across the entrance end of the compression chamber, as particularly illustrated in Figure 16, but before the formation of the next bale the plunger operates to move the frame F and the parts carried thereby a predetermined distance along the press in a direction away from the baling or compression chamber resulting in a corresponding length of wire being drawn from the spool S. As the bale is formed within the compression chamber the wire W will be carried inwardly of the compression chamber a distance commensurate with the extent of bale formation and at the same time the frame F and its parts will be moved in return direction a corresponding distance.

This operation is continued until the frame F at the completion of the bale compression brings the needle of the tying mechanism in proper or working position. By this means the bale being formed is prevented from breaking the wire or in any way injuring the bale and thereby assuring a completed and tied bale as discharged from the press being in the best possible condition.

The initial movement of the frame F and its parts in a direction away from the baling or compression chamber is accomplished automatically under the action of the piston P.

A side wall of the press B is provided with a suitably positioned and longitudinally directed slot 74 through which is directed a lug or projection 75 carried by the piston P. This lug or projection 75 is engaged with an elongated member 76 supported for reciprocation by said side wall exteriorly of the press. This member 76 has movement at all times with the piston P. Pivotally connected, as at 77, with the side wall of the press below the member 76 is an arcuate sweep arm 78 which, when moved in one direction, is adapted to have contact with one of the arms 43 of the frame F. The throw of the arm 78 will move the frame F and its parts a requisite distance.

Normally the member 76 is free of the sweep arm 78.

Immediately below the member 76 is a trackway 79 in which is arranged for sliding movement a block 80 carrying an outstanding pin 81 which is received within an arcuate slot 82 in the sweep arm 78.

Pivotally connected intermediate its ends, as at 83, to the member 76 is a driving lever 84 having its forward or working end grooved, as at 85, to have effective engagement or contact with the pin 81 when said forward end of the driving lever 84 is lowered into working position. Normally this lever 84 lies substantially parallel to the member 76 and out of the path of the pin 81 but just before the shafts 19 each completes its operation the forward end of this lever 84 is forced downwardly, as in Figure 11, so that upon the next stroke of the plunger or piston P the pin 81 will coact with the sweep arm 78 in a manner to impart the desired travel to the frame F, as illustrated in Figure 12. When the lever 84 is in working position it will be noted that it is directed on a forward and downward incline and when the sweep arm 78 is at the limit of its movement, the arcuate tail piece 86 continuing from the pivoted end of the arm 78 will bring a roller 87 in the path of travel of the lowered forward end of the lever 84 so that as the member 76 returns the roller 87 will engage the under surface of the lever 84 and return the same to its normal position or any position parallel with the member 76. It is to be noted that the sweep arm 78 will be returned as the frame F is intermittently returned during the formation of the bale.

At a point above the forward portion of the lever 84 the adjacent side wall of the press B is provided with an outstanding rock shaft 88 terminating in a lateral extension 89, and also carried by the shaft 88 directly above the lever 84 but in advance of this pivotal mounting 83 is a dog 90.

Connected to the dog 90 and to the adjacent side wall of the press B is a retractile spring 91 which, when the shaft 88 is rocked in one direction, serves to maintain said dog 90 and the extension 89 of the shaft 88 in raised position and when said dog 90 has been moved downwardly to lower the forward end portion of the lever 84 the spring 91 serves to maintain the dog in such position.

One of the shafts 19 has secured thereto a suitably positioned outstanding arm 92 which, just before said shaft completes its rotation, strikes the extension 89 of the shaft 88 and rotates said shaft 88 a distance sufficient to assure the dog 90 having requisite contact with the lever 84 to bring said lever in requisite working or effective position with respect to the pin 81. As the member 76 moves forward the raised rear portion of the lever 84 will have contact from below with the dog 90 and throw or return the same to its raised or normal position with the resultant return to the horizontal of the extension 89.

From the foregoing description it is thought to be obvious that a baling press constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with a baling press including a compression chamber and a plunger working therein, a wire carrying needle supported by the press at one side thereof, means for directing the needle through the press upon completion of a bale within the compression chamber and for retracting the needle, spaced fingers arranged at the side of the press toward which the needle travels when carrying wire through the compression chamber, the needle traveling an extent to carry the wire beyond said fingers, means for supporting said fingers for movement toward or from each other and for swinging movement, said fingers after the needle has passed therebeyond engaging the wire from within at opposite sides of the needle for holding the wire extended through the compression chamber when the needle is retracted, the outer end of the needle being provided with a head extending laterally beyond opposite sides thereof, the periphery of the head being grooved to receive the wire, said head being substantially circular in form.

2. In combination with a baling press including a compression chamber and a plunger working therein, a wire carrying needle supported by the press at one side thereof, means for directing the needle through the press upon completion of a bale within the compression chamber and for retracting the needle, spaced fingers arranged at the side of the press toward which the needle travels when carrying wire through the compression chamber, the needle traveling an extent to carry the wire beyond said fingers, means for supporting said fingers for movement toward or from each other and for swinging movement, said fingers after the needle has passed therebeyond engaging the wire from within at opposite sides of the needle for holding the wire extended through the compression chamber when the needle is retracted, means for drawing the wire at opposite sides of the fingers, said means holding portions of the wire in overlying relation, and a twisting means engageable with said overlying portions.

3. In combination with a baling press including a compression chamber and a plunger working therein, a wire carrying needle supported by the press at one side thereof, means for directing the needle through the press upon completion of a bale within the compression chamber and for retracting the needle, spaced fingers arranged at the side of the press toward which the needle travels when carrying wire through the compression chamber, the needle traveling an extent to carry the wire beyond said fingers, means for supporting said fingers for movement toward or from each other and for swinging movement, said fingers after the needle has passed therebeyond engaging the wire from within at opposite sides of the needle for holding the wire extended through the compression chamber when the needle is retracted, means for drawing the wire at opposite sides of the fingers, said means holding portions of the wire in overlying relation, a twisting means engageable with said overlying portions, means for supporting said twisting means for sliding movement along the press, means operating automatically to move said twisting means in a direction away from the compression chamber after the twisting operation, said means being returned to working position under the influence of the bale as formed within the compression chamber.

4. A device of the class described including a compression chamber, a plunger working therein, a wire carrying needle, means for directing said needle across the compression chamber, a tying mechanism supported for sliding movement toward or from the compression, said tying mechanism becoming effective after the wire has been directed across the compression chamber, said tying mechanism including a member for holding the free end of the wire so that said tying mechanism when moved in a direction away from the compression chamber will draw a length of wire therewith, said tying mechanism being returned to working position by the pull imposed upon the wire as the bale is formed within the compression chamber.

5. A device of the class described including a compression chamber, a plunger working therein, a wire carrying needle, means for directing said needle across the compression chamber, a tying mechanism supported for sliding movement toward or from the compression chamber, said tying mechanism becoming effective after the wire has been directed across the compression chamber, said tying mechanism including a member for holding the free end of the wire so that said tying mechanism when moved in a direction away from the compression chamber will draw a length of wire therewith, said tying mechanism being returned to working position by the pull imposed upon the wire as the bale is formed within the compression chamber, the means for holding the tying mechanism in a direction away from the compression chamber comprising a member supported for reciprocation, means for coupling the same to the plunger for movement therewith, a pivoted sweep arm, and means operating automatically after the completion of a tying operation to engage the reciprocating member with the sweep arm to move the sweep arm in a direction in contact with the tying mechanism to impart movement to such mechanism in a direction away from the compression chamber.

6. A device of the class described comprising a compression chamber, a plunger working therein, a needle traveling across the compression chamber and carrying a double strand of wire thereacross, said needle being normally retracted beyond one side of the compression chamber, a tying means at the opposite sides of the compression chamber and including a mechanism normally clamping an end portion of the wire, means for arranging the portions of the wire adjacent the tying means into a plurality of overlying portions, said tying means engaging said overlying portions to twist the same one about the others, means for severing the wire after such twisting action, said tying means being normally in an inoperative position, and means for automatically moving said tying means into working position after the completion of the bale and the arrangement of the overlying portions of the wire.

In testimony whereof I hereunto affix my signature.

NOAH N. BURKHOLDER.